April 24, 1962 P. S. HOPPER 3,030,771
TURBO ROCKET FUEL CONTROL SYSTEM
Filed March 2, 1959
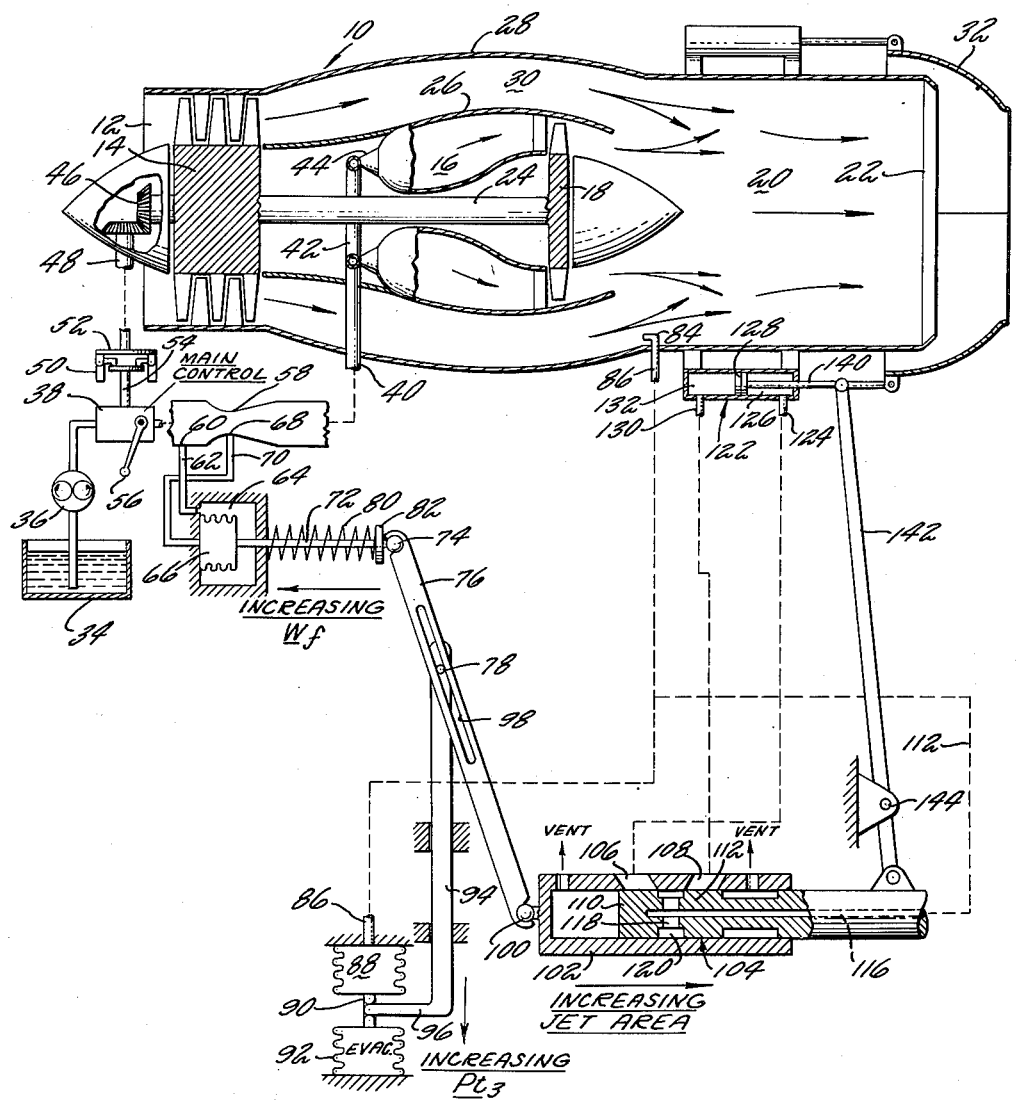
INVENTOR
PHILIP S. HOPPER
BY
ATTORNEY

United States Patent Office 3,030,771
Patented Apr. 24, 1962

3,030,771
TURBO ROCKET FUEL CONTROL SYSTEM
Philip S. Hopper, Manchester, Conn., assignor to United Aircraft Corporation, East Hartford, Conn., a corporation of Delaware
Filed Mar. 2, 1959, Ser. No. 796,461
5 Claims. (Cl. 60—35.6)

This invention relates to turbo rocket engines, more particularly to a control system for an afterburning turbo rocket engine.

The control system of the invention is predicated on the use of a conventional speed governing system to establish a selected compressor speed through regulation of rocket fuel flow in a manner comparable to conventional fuel controls. In order to regulate afterburner combustion, however, air flow through the engine must be regulated. The only controllable variable in the engine for doing this is exhaust nozzle area.

It is desirable to obtain an optimal fuel-air ratio such as the stoichiometric fuel-air ratio in the afterburner section of the engine and, therefore, it is assumed that the final temperature of the combustion gases will be fixed. Air flow then will be determined only by pressure and exhaust nozzle area. Total pressure is an independent variable so regulation of air flow must be accomplished through variation of nozzle area. The area should be a function of fuel metering valve area and tailpipe total pressure, or fuel flow and tailpipe total pressure.

An object of this invention is to provide a control system for an afterburning turbo rocket engine.

Another object of the invention is to provide a control system for an afterburning turbo rocket engine which maintains an optimal fuel-air ratio in the engine afterburner.

Another object of the invention is to provide a control system for a turbo rocket engine which determines air flow through the engine by regulation of exhaust nozzle area as a function of fuel flow and tailpipe total pressure.

Still another object of the invention is to provide a control system for the variable area exhaust nozzle of an afterburning turbo rocket engine having a speed governed fuel supply, the control system including fuel flow and tailpipe pressure responsive devices acting through a variable ratio linkage and a servo system to regulate nozzle area and maintain a stoichiometric fuel-air ratio in the afterburner.

Other objects and advantages will be apparent from the following specification and claims and from the accompanying drawing which illustrates an embodiment of the invention.

In the drawing:

The single figure shows an afterburning turbo rocket engine having the control system of my invention.

Referring to the drawing in detail, 10 indicates a turbo rocket engine having inlet 12, compressor 14, decomposition chamber 16, turbine 18, afterburner 20 and exhaust nozzle 22. Shaft 24 drivingly connects compressor 14 and turbine 18. Inner casing 26 surrounds decomposition chamber 16 and turbine 18, and together with outer casing 28 defines annular duct 30 through which air flows from compressor 14 to afterburner 20 for mixing and combustion. Flaps 32 variably control the area of exhaust nozzle 22.

Rocket fuel for the engine is pumped from tank 34 by pump 36 through fuel control 38 and conduit 40 to ring manifold 42 from which the fuel is injected into the decomposition chamber through a plurality of nozzles 44. An actual speed signal is provided fuel control 38 by means of gear 46 on the forward end of shaft 24 which drives gear shaft 48. A pair of governor flyweights 50 are mounted on plate 52 connected to the gear shaft, the flyweights contacting rod 54 which is operatively connected with a metering valve within the fuel control. The datum for the speed governor is adjusted by means of manual lever 56 connected to the fuel control. In addition to regulating fuel flow in accordance with a selected engine speed, fuel control 38 also may regulate fuel flow as a function of other engine parameters such as pressure and temperature. A fuel control suitable for this purpose is disclosed in Patent No. 2,822,666 issued February 11, 1958, to Stanley G. Best.

The rocket fuel is a monopropellant of the acetylene family such as propyne, the fuel decomposing in chamber 16 to form hydrocarbons and free carbon. The exothermic process gives off heat as well as a combustible fuel, the heat energy driving turbine 18 and compressor 14 as the decomposition products flow from the decomposition chamber. The products flow into afterburner 20 where they are mixed with the air from duct 30. This mixture ignites spontaneously and the gases then are discharged through exhaust nozzle 22.

Flow of the fuel, $W_f$, is measured by venturi 58 in conduit 40. Entrance pressure is sensed by static pressure station 60 and ducted by conduit 62 to chamber 64 containing bellows 66. Throat pressure is sensed by static pressure station 68 and ducted by conduit 70 to the interior of bellows 66. The pressure differential across the bellows is a measure of fuel flow to the engine and displacement of the free end of the bellows in response to pressure differential variations displaces rod 72 connected at one end to the bellows. The other end of the rod is pivotably connected at 74 with the upper end of lever 76 which rotates about movable pivot 78. Spring 80 surrounds rod 72 and is positioned between shoulder 82 on the rod and the casing for chamber 64 to preload bellows 66.

The position of movable pivot 78 is adjusted vertically in accordance with total tailpipe pressure. $P_{t3}$. Total pressure station 84 is located in outer casing 28 just downstream of where the air in annular duct 30 enters afterburner 20. The pressure station is connected by conduit 86 to the interior of bellows 88. The free end of the bellows is connected by rod 90 to the free end of evacuated bellows 92 which is coaxially mounted in an opposing sense with respect to bellows 88. The displacement of the rod, therefore, is a function of absolute total pressure in the tailpipe.

Link 94 has arm 96 connected to the midpoint of rod 90 and the opposite end of the link contains pivot 78. The pivot engages slot 98 in lever 76 and vertical movement of the pivot as a result of tailpipe pressure variations rotates the lever about pivot 74.

The lower end of lever 76 is pivotally connected at 100 to movable sleeve 102 surrounding pilot valve 104. The sleeve contains ports 106 and 108 which are located opposite lands 110 and 112, respectively, on the pilot valve when the pilot valve is in its null position. Servo fluid, such as pressure air obtained from the engine by branch conduit 112, is admitted through bore 116 in the pilot valve and passage 118 to groove 120 defined between lands 110 and 112. Ports 106 and 108 are connected to flap actuating cylinders 122, port 106 being connected by conduit 124 to chamber 126 at the right of actuating piston 128 and port 108 being connected by conduit 130 to chamber 132 at the left of the piston.

Piston 128 is connected by rod 140 to flaps 32. Lever 142 is connected at its upper end to rod 140 and at its lower end to pilot valve 104 and pivots about fulcrum 144 to provide a feedback from flaps 32 to the pilot valve.

Operation

In this control system fuel flow is measured by a venturi which produces a differential pressure signal between the venturi entrance and the venturi throat. $Q$ (mass fuel rate) $=\rho A V$, where $V=\sqrt{2gh}$ with $h$ being the hydraulic head in feet of fuel. V thus is equal to some constant times the differential pressure. The differential pressure is a function of fuel flow and also, for stoichiometric fuel-air ratio, is a function of air flow. Since the temperature for the ideal mixture is assumed fixed at the afterburner exit and the exhaust nozzle is choked under design conditions, air flow is a function only of nozzle area and pressure. The pressure of the air flow through compressor 14 will be determined by compressor rotational speed, altitude and air speed of the aircraft in which the engine is installed. Exhaust nozzle area, therefore, is the variable which must be regulated to maintain the proper combustible mixture in the afterburner. Through the use of a multiplying or dividing linkage with a variable lever arm in which fuel flow signal is fed into one end of the linkage and afterburner pressure is used to vary the lever ratio, an output of the linkage can be obtained which will be a function of nozzle area.

An increase in fuel flow to decomposition chamber 16 will tend to collapse bellows 66 and move rod 72 to the left, and a decrease in tailpipe pressure will collapse bellows 88 and move link 94 upward. Either of these motions will result in counterclockwise movement of the lower end of lever 76 to move sleeve 102 to the right. This movement of the sleeve will connect port 106 with groove 120 to admit servo fluid through conduit 124 to chamber 126 at the right of piston 128. At the same time chamber 132 at the left of the piston will be vented. The pressure differential across the piston will move it to the left to open flaps 32 and increase the area of exhaust nozzle 22. As the flaps open lever 142 is rotated in a counterclockwise direction and pilot valve 104 is moved to the right until it reaches its null position. At this time the system is in equilibrium. The increased nozzle area results in increased air flow through the compressor to establish the fuel-air ratio in afterburner 20 at the stoichiometric value.

A decrease in fuel flow or an increase in tailpipe pressure will cause movement of lever 76 so that its lower end is rotated in a clockwise direction. Sleeve 102 will be moved to the left to admit servo pressure through port 108 and conduit 130 to chamber 132 at the left of piston 128. The resulting pressure differential across piston 128 will move it to the right to close flaps 32 and reduce exhaust nozzle area. This will reduce air flow through the compressor to maintain the stoichiometric fuel-air ratio in the afterburner.

It is to be understood that the invention is not limited to the specific embodiment herein illustrated and described, but may be used in other ways without departure from its spirit as defined by the following claims.

I claim:

1. For a turbo rocket engine having a compressor, a turbine drivingly connected to said compressor, a tailpipe downstream of said turbine, duct means extending directly from the discharge end of said compressor to said tailpipe, heat generating means upstream of said turbine and communicating with said turbine, said heat generating means being independent of said duct means, a variable area exhaust nozzle attached to said tailpipe, a fuel supply conduit for delivering fuel to said heat generating means and means responsive to the rotational speed of said compressor for regulating fuel flow through said conduit to said heat generating means, a control system including means for sensing fuel flow through said conduit, lever means having a movable pivot, an operative connection between said fuel flow sensing means and said lever, means for sensing tailpipe pressure, an operative connection between said pressure sensing means and said movable pivot to adjust the position of said pivot, means for varying the area of said exhaust nozzle, and an operative connection between said lever and said area varying means for varying nozzle area in response to movement of said lever to maintain a constant fuel-air ratio in said tailpipe.

2. For a turbo rocket engine having a compressor, a turbine drivingly connected to said compressor, a tailpipe downstream of said turbine, duct means extending directly from the discharge end of said compressor to said tailpipe, heat generating means upstream of said turbine and communicating with said turbine, said heat generating means being independent of said duct means, a variable area exhaust nozzle attached to said tailpipe, a fuel supply conduit for delivering fuel to said heat generating means and means responsive to the rotational speed of said compressor for regulating fuel flow through said conduit to said engine, a control system including means for sensing fuel flow through said conduit, lever means having a movable pivot, an operative connection between said fuel flow sensing means and said lever, means for sensing tailpipe pressure, an operative connection between said pressure sensing means and said movable pivot to adjust the position of said pivot, flaps for varying the area of said exhaust nozzle, actuating means for moving said flaps, a servo system controlling said actuating means, said servo system being operatively connected with said lever for varying exhaust nozzle area in response to movement of said lever to maintain a constant fuel-air ratio in said tailpipe, and feedback means between said flaps and said servo system for nulling said servo system.

3. For a turbo rocket engine having a compressor, a turbine drivingly connected to said compressor, a tailpipe downstream of said turbine, duct means extending directly from the discharge end of said compressor to said tailpipe, heat generating means upstream of said turbine and communicating with said turbine, said heat generating means being independent of said duct means, a variable area exhaust nozzle attached to said tailpipe, a fuel supply conduit for delivering fuel to said heat generating means and means responsive to the rotational speed of said compressor for regulating fuel flow through said conduit to said engine, a control system including venturi means in said conduit, means for sensing venturi entrance pressure and throat pressure, first flexible means responsive to the differential of said venturi and throat pressure, lever means having a movable pivot, an operative connection between said first flexible means and one end of said lever, means for sensing total tailpipe pressure, second flexible means responsive to total tailpipe pressure absolute, an operative connection between said second flexible means and said movable pivot to adjust the position of said pivot, flaps for varying the area of said exhaust nozzle, actuating means for moving said flaps, a servo system controlling said actuating means, said servo system being operatively connected with the other end of said lever for varying exhaust nozzle area in response to movement of said lever to maintain a constant fuel-air ratio in said tailpipe, and feedback means between said flaps and said servo system for nulling said servo system.

4. For a turbo rocket engine having an outer casing, a compressor within said casing, an inner casing surrounding said turbine and cooperating with said outer casing to form an annular passage for the discharge from said compressor, a turbine within said inner casing and drivingly connected to said compressor, a decomposition chamber within said inner casing in fluid communication with said turbine, a conduit for supplying fuel to said decomposition chamber, an afterburner downstream of said turbine communicating with said turbine and said annular passage, and a variable area exhaust nozzle attached to said afterburner, a control system including means for sensing fuel flow through said conduit, means for sensing afterburner pressure and means for regulating the area of said exhaust nozzle in accordance with fuel flow through said conduit and pressure in said afterburner to maintain a constant fuel-air ratio in said afterburner.

5. A control for a turbo rocket engine as in claim 4 in which the means for regulating the area of the exhaust nozzle is responsive to a function of the product of the fuel flowing in said conduit and the pressure in said afterburner.

References Cited in the file of this patent

UNITED STATES PATENTS

| | | |
|---|---|---|
| 2,623,352 | Sedille et al. | Dec. 30, 1952 |
| 2,683,348 | Petry | July 13, 1954 |
| 2,688,841 | Decher et al. | Sept. 14, 1954 |
| 2,778,191 | Thompson | Jan. 22, 1957 |
| 2,883,828 | Howell | Apr. 28, 1959 |
| 2,942,413 | Corbett | June 28, 1960 |